US012459660B1

(12) United States Patent
Copeland

(10) Patent No.: US 12,459,660 B1
(45) Date of Patent: Nov. 4, 2025

(54) LIMITED SLIP TORQUE-LIMITER COUPLING

(71) Applicant: Rolls-Royce Corporation, Indianapolis, IN (US)

(72) Inventor: Andrew D. Copeland, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/949,477

(22) Filed: Nov. 15, 2024

(51) Int. Cl.
*B64D 31/06* (2024.01)
*F02C 7/36* (2006.01)
*B64C 29/00* (2006.01)

(52) U.S. Cl.
CPC .............. *B64D 31/06* (2013.01); *F02C 7/36* (2013.01); *B64C 29/0033* (2013.01); *F05D 2220/323* (2013.01); *F05D 2260/4023* (2013.01); *F05D 2270/051* (2013.01); *F05D 2270/052* (2013.01)

(58) Field of Classification Search
CPC .................................. B64D 31/06; F02C 7/36
See application file for complete search history.

(56) References Cited

U.S. PATENT DOCUMENTS

| | | | |
|---|---|---|---|
| 3,448,635 A | 6/1969 | Nelson | |
| 5,570,765 A | 11/1996 | Patridge | |
| 6,260,782 B1 * | 7/2001 | Smithson | B60R 22/341 297/472 |
| 7,210,566 B2 | 5/2007 | Baxter, Jr. | |
| 7,390,278 B2 | 6/2008 | Krisher | |
| 7,481,307 B2 | 1/2009 | Teraoka | |
| 8,771,129 B2 | 7/2014 | Bradford, Jr. | |
| 10,415,482 B2 * | 9/2019 | Marconi | F02C 3/10 |
| 11,333,077 B2 * | 5/2022 | Foutch | F02C 7/36 |
| 2006/0046890 A1 | 3/2006 | Aikawa | |
| 2006/0211532 A1 | 9/2006 | Krisher | |
| 2014/0011599 A1 | 1/2014 | Garvey et al. | |
| 2017/0159574 A1 * | 6/2017 | Paul | F01D 21/003 |
| 2023/0278719 A1 * | 9/2023 | Cafaro | B64D 27/33 701/3 |

FOREIGN PATENT DOCUMENTS

CN        100467896 C      3/2009

* cited by examiner

*Primary Examiner* — Courtney D Heinle
*Assistant Examiner* — John S Hunter, Jr.
(74) *Attorney, Agent, or Firm* — Barnes & Thornburg

(57) ABSTRACT

An aircraft includes a first propulsion unit, a second propulsion, and a controller configured to increase thrust output in one of the first propulsion unit or the second propulsion unit in response to a detected thrust reduction from the other of the first propulsion unit. Each of the first propulsion unit and the second propulsion unit include a rotor driven by a gas turbine engine with a drive shaft, an output shaft coupled between the drive shaft and the driven rotor and a mechanical coupler for decoupling the output shaft from the drive shaft.

19 Claims, 4 Drawing Sheets

LIMITED SLIP TORQUE-LIMITER COUPLING

FIELD OF THE DISCLOSURE

The present disclosure relates generally to gas turbine engines, and more specifically to torque couplings for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and a drive shaft. The drive shaft in turn can rotate a rotor to provide thrust to the aircraft.

In gas turbine engine applications, other components may be coupled to, or driven, by the drive shaft. In certain conditions, the gas turbine engine may suddenly increase power, resulting in a sudden increase in torque provided by the drive shaft. The increase in torque may result in a torque spike. The torque spike may exceed maximum operational limits of components coupled to the drive shaft, resulting in damage to the components.

SUMMARY

The present disclosure may comprise one or more of the following features and combinations thereof.

An aircraft may comprise a first propulsion unit, a second propulsion unit, and a controller. The first propulsion unit may include a first drive system and a first driven rotor coupled to the first drive system. The first drive system may be configured to output rotational motion to the first driven motor. The first driven rotor may be configured to accelerate air providing thrust to move the aircraft.

In some embodiments, the second propulsion unit may include a second drive system and a second driven rotor coupled to the second drive system. The second drive system may be configured to output rotational motion to the second driven rotor. The second driven rotor may be configured to accelerate air providing thrust to move the aircraft.

In some embodiments, the controller may be coupled to both the first propulsion unit and the second propulsion unit. The controller may be configured to increase thrust output in one of the first propulsion unit or the second propulsion unit in response to a detected thrust reduction from the other of the first propulsion unit or the second propulsion unit to maintain a desired overall level of thrust delivery from a combination of the first propulsion unit and the second propulsion unit.

In some embodiments, each of the first propulsion unit and the second propulsion unit may include a gas turbine engine with a drive shaft, an output shaft coupled between the drive shaft and the respective driven rotor and a mechanical means for decoupling and recoupling the output shaft from the drive shaft. The mechanical means may decouple the output shaft from the drive shaft in response to a transmitted torque passing between the drive shaft and the output shaft exceeding a predetermined limit. The mechanical means may recouple the output shaft to the drive shaft upon return of the transmitted torque to less than the predetermined limit. The mechanical means may decouple and recouple the output shaft from the drive shaft without reliance on electronic controls so as to quickly avoid over-torque conditions that can damage propulsion unit systems.

In some embodiments, the aircraft may comprise a torquemeter disposed along the output shaft. The mechanical means may be configured to protect the torquemeter from the over-torque conditions when the transmitted torque exceeds the predetermined limit. The torquemeter may be in electrical communication with the controller to communicate a torque provided by the gas turbine engine.

In some embodiments, the mechanical means may comprise a limited-slip coupler having a first portion and a second portion. The first portion may be coupled to the output shaft. The second portion may be coupled to the drive shaft. The first portion and the second portion may be shaped to have corresponding mating geometry. The first portion may be shaped to fit at least partially within the second portion.

In some embodiments, the second portion may include an inner contact surface and the first portion includes an outer contact surface. The inner contact surface of the second portion may be configured to engage with the outer contact surface of the first portion such that rotation of the second portion drives rotation of the first portion when the transmitted torque is less than the predetermined limit.

In some embodiments, the mechanical means may comprise a bolt. The bolts may extend through an aperture formed in each of the first portion and the second portion to couple the first portion and the second portion together. The bolt may be preloaded to at least partially determine the predetermined limit.

In some embodiments, the angle of the inner contact surface and the outer contact surface with respect to the drive shaft may at least partially determines the predetermined limit.

In some embodiments, the limited-slip coupler may be configured such that a head of the bolt and the second portion are configured to rotate relative to each other when the transmitted torque exceeds the predetermined limit.

In some embodiment, the limited-slip coupler may be configured such that the inner contact surface the second portion and the outer contact surface of the first portion rotate relative to each other when the transmitted torque exceeds the predetermined limit.

In some embodiments, each of the first propulsion unit and the second propulsion unit may include a torquemeter, an output shaft controller, and clutch coupled along the output shaft between the driven rotor and the mechanical means for decoupling the output shaft from the drive shaft to manage torque transmitted to the driven rotor.

According to another aspect of the present disclosure, an aircraft may comprise a first propulsion unit, a second propulsion unit, and a controller. The first propulsion unit may include a first drive system and a first driven rotor coupled to the first drive system. The first drive system may be configured to output rotational motion to the first driven motor. The first driven rotor may be configured to accelerate air providing thrust to move the aircraft.

In some embodiments, the second propulsion unit may include a second drive system and a second driven rotor coupled to the second drive system. The second drive system may be configured to output rotational motion to the second driven rotor. The second driven rotor may be configured to accelerate air providing thrust to move the aircraft.

In some embodiments, the controller may be coupled to both the first propulsion unit and the second propulsion unit.

The controller may be configured to increase thrust output in one of the first propulsion unit or the second propulsion unit in response to a detected thrust reduction from the other of the first propulsion unit or the second propulsion unit to maintain a desired overall level of thrust delivery from a combination of the first propulsion unit and the second propulsion unit.

In some embodiments, each of the first propulsion unit and the second propulsion unit may include a gas turbine engine with a drive shaft, an output shaft coupled between the drive shaft and the respective driven rotor and a limited-slip coupler. The limited slip coupler may have a first portion coupled to the output shaft and a second portion coupled to the drive shaft. The limited-slip coupler may decouple the output shaft from the drive shaft in response to a transmitted torque passing between the drive shaft and the output shaft exceeding a predetermined limit. The limited-slip coupler may recouple the output shaft to the drive shaft upon return of the transmitted torque to less than the predetermined limit.

In some embodiments, the torquemeter may be disposed along the output shaft. The limited-slip coupler may be configured to protect the torquemeter from over-torque conditions when the transmitted torque exceeds the predetermined limit. The predetermined limit may be less that a maximum torque limit of the torquemeter.

In some embodiments, the second portion may include an inner contact surface. The first portion may include an outer contact surface. The inner contact surface of the second portion may be configured to engage with the outer contact surface of the first portion such that rotation of the second portion drives rotation of the first portion when the transmitted torque is less than the predetermined limit.

In some embodiments, the limited-slip coupler may comprise a bolt extending through an aperture formed in each of the first portion and the second portion. The bolt may couple the first portion and the second portion together. The bolt may be preloaded to at least partially determine the predetermined limit.

In some embodiments, at least one of an angle of the inner contact surface and the outer contact surface with respect to the drive shaft or a surface finish of the inner contact surface and the outer contact surface may at least partially determine the predetermined limit.

In some embodiments, each of the first propulsion unit and the second propulsion unit may include a torquemeter, an output shaft controller, and clutch coupled along the output shaft between the driven rotor and the limited-slip coupler for decoupling the output shaft from the drive shaft to manage torque transmitted to the driven rotor.

According to another aspect of the present disclosure an aircraft may comprise a first propulsion unit, a second propulsion unit, and a controller.

In some embodiments, the controller may be coupled to increase thrust output in one of the first propulsion unit or the second propulsion unit in response to a detected thrust reduction from the other of the first propulsion unit or the second propulsion unit to maintain a desired overall level of thrust delivery from a combination of the first propulsion unit and the second propulsion unit.

In some embodiments, each of the first propulsion unit and the second propulsion unit may include a gas turbine engine with a drive shaft, an output shaft coupled between the drive shaft and the respective driven rotor, and a limited-slip coupler.

The mechanical means may decouple the output shaft from the drive shaft in response to a transmitted torque passing between the drive shaft and the output shaft exceeding a predetermined limit.

In some embodiments, the limited-slip coupler may have a first portion coupled to the output shaft and a second portion coupled to the drive shaft. The limited-slip coupler may decouple the output shaft from the drive shaft in response to a transmitted torque passing between the drive shaft and the output shaft exceeding a predetermined limit. The limited-slip coupler may recouple the output shaft to the drive shaft upon return of the transmitted torque to less than the predetermined limit.

These and other features of the present disclosure will become more apparent from the following description of the illustrative embodiments.

DETAILED DESCRIPTION OF THE DRAWINGS

Figure 1:
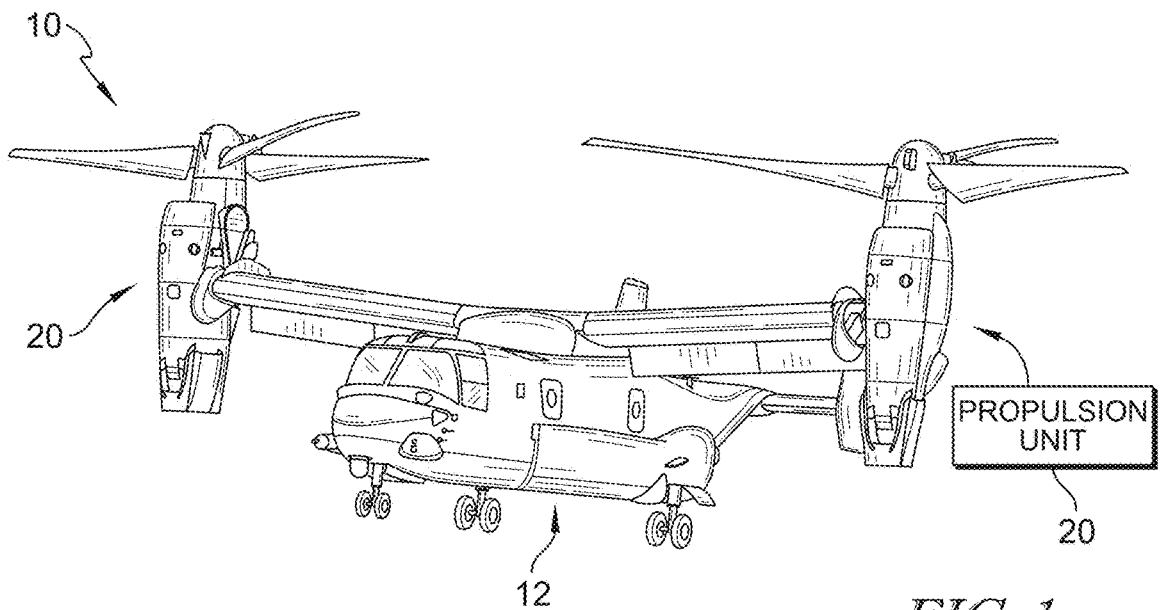
FIG. 1 is a view of an aircraft with two propulsion units that are operationally interconnected to support one another in providing thrust for the aircraft.

For the purposes of promoting an understanding of the principles of the disclosure, reference will now be made to a number of illustrative embodiments illustrated in the drawings and specific language will be used to describe the same.

An aircraft 10 is shown in FIG. 1. The aircraft 10 comprises a fuselage 12 and a plurality of propulsion units 20. In the illustrative embodiment, the aircraft 10 includes two propulsion units 20, each one of the propulsion units 20 disposed on an opposite side of the fuselage 12 with the fuselage 12 in between the two propulsion units 20. In the illustrative embodiment, the aircraft 10 is a tiltrotor aircraft.

Figure 2:
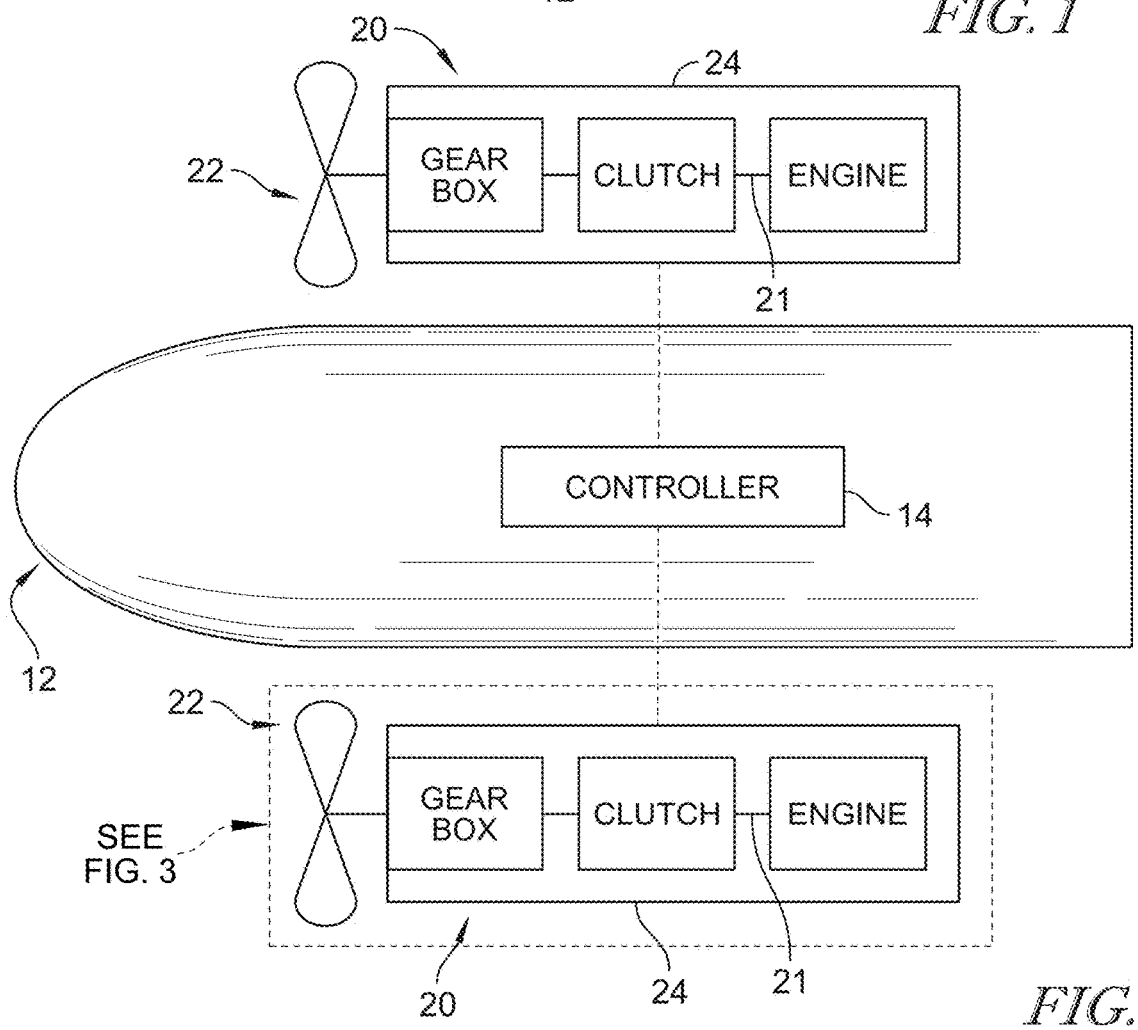
FIG. 2 is a top schematic view of the aircraft of FIG. 1 showing each of the two propulsion units include a respective gas turbine engine coupled to a rotor to cause rotation of the rotor to provide thrust to lift the aircraft, each of the propulsion units in electrical communication with a controller operable to redistribute power from a first one of propulsion units to a second one of propulsion units upon detecting a reduction of thrust from the first propulsion unit to maintain a desired overall level of trust of the aircraft.
Figure 3:
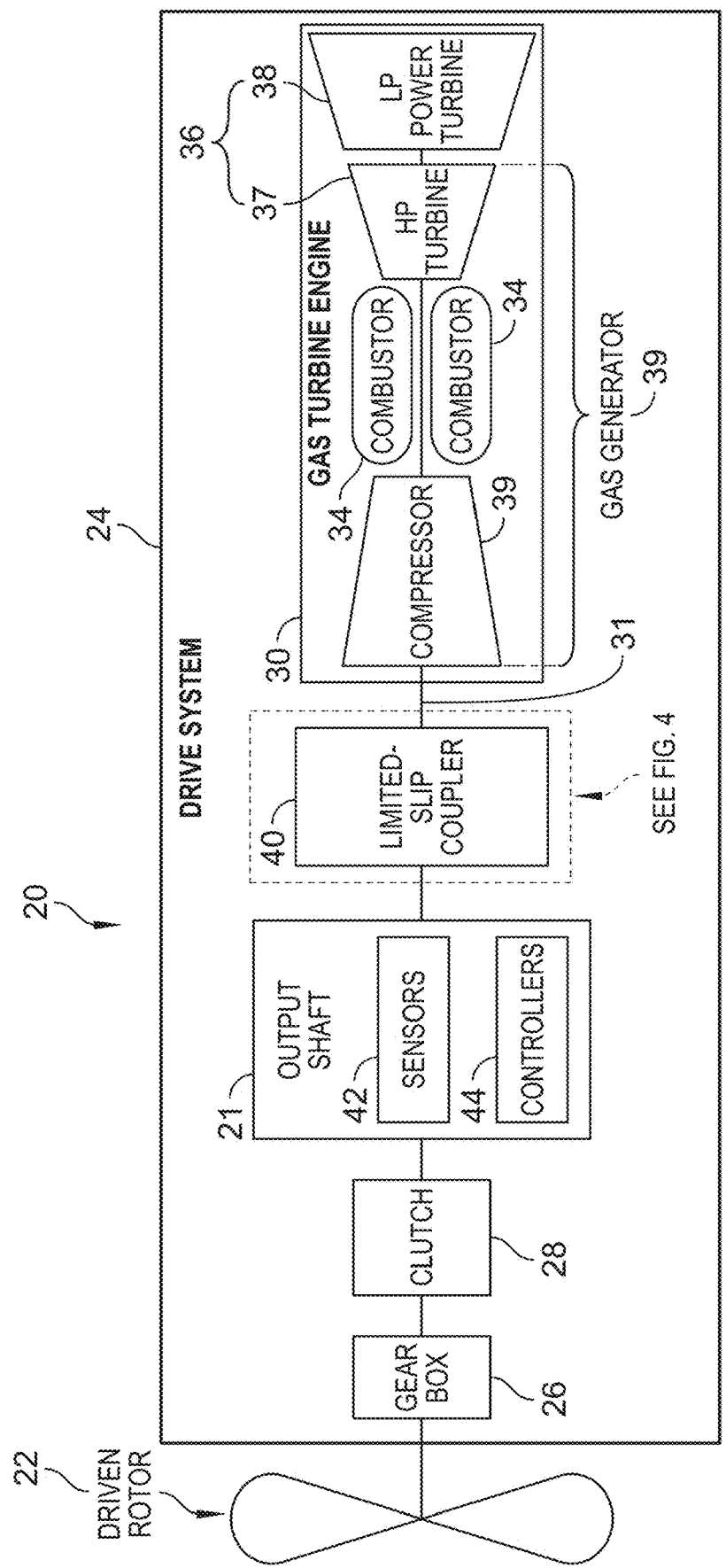
FIG. 3 is a more detailed schematic view of the one of the propulsion units of FIG. 2 showing that the propulsion unit includes a limited-slip coupler positioned between a drive shaft of the gas turbine engine and an output shaft coupled to the rotor.

As shown in FIGS. 2-3, each of the propulsion units comprises a rotor 22 and a drive system 24 coupled to the rotor 22 via an output shaft 21. The drive system 24 is configured to output rotational motion to the rotor 22 via the output shaft 21 which drives the rotor 22. The driven rotor 22 is configured to rotate to accelerate air and provide thrust to move the aircraft 10.

As shown in FIG. 2, each of the propulsion units 20 is in electrical communication with a controller 14. The controller 14 is coupled to both propulsion units 20 and is configured to increase the thrust output in one of the propulsion units 20 in response to a detected thrust reduction from the other of the propulsion unit 20. For example, if the controller 14 detects that one of the propulsion units 20 fails or otherwise has a decreased or lower thrust output than expected and/or needed to maintain flight of the aircraft 10, the controller 14 may divert or transfer power from the propulsion unit 20 with the decreased thrust to the other propulsion unit 20. The controller 14 may redistribute the power to the other, normally operating propulsion unit 20 to maintain a desired overall level of thrust delivery from a combination of both propulsion units 20.

As shown in FIGS. 2-3, the drive system 24 of the propulsion unit 20 comprises a gear box 26, a clutch 28, and a gas turbine engine 30 having a drive shaft 31. The clutch 28 and gear box 26 are disposed along the output shaft 21 of the drive system 24. The drive system 24 further includes a mechanical means 40 for coupling and decoupling the drive shaft 31 from the output shaft 21 based on the torque being transmitted from the drive shaft 31 exceeding a predetermined limit. In some embodiments, the predetermined limit is based on a maximum torque limit of the output shaft 21 and/or components on the output shaft 21.

In the illustrative embodiment, the mechanical means 40 comprises a limited-slip coupler 40 that is disposed between the gas turbine engine 30 and the rest of the drive system 24, where one portion 60 of the limited-slip coupler 40 is coupled to the drive shaft 31 of the gas turbine engine 30 and the other portion 50 of the limited-slip coupler 40 is coupled to the output shaft 21.

As will be discussed in more detail below, the two portions 50, 60 of the limited-slip coupler 40 are designed to engage and disengage with each other, working to connect or disconnect the drive shaft 31 from the output shaft 21. The limited-slip coupler 40 engages or disengages depending on a torque transmitted from drive shaft 31 of the gas turbine engine 30 to the output shaft 21 being above or below a predetermined limit of the coupler 40. When a torque transmitted from the drive shaft 31 of the gas turbine engine 30 exceeds the predetermined limit of the limited-slip coupler 40, the limited-slip coupler 40 is designed to disengage the output shaft 21 from the drive shaft 31, with the two portions 50, 60 of the coupler 40 slipping relative to each other to prevent the torque exceeding the predetermined limit from being transmitted to the output shaft 21. When the torque being transmitted from the drive shaft 31 falls below the predetermined limit of the limited-slip coupler 40, the two portions 50, 60 stop slipping relative to each other, reengage, and continued to transmit the torque from the drive shaft 31 to the output shaft 21.

The gas turbine engine 30 includes a compressor 32, a combustor 34, and a turbine 36 as shown in FIG. 3. In the illustrative embodiment, the turbine 36 includes a high pressure turbine 37 and a low pressure turbine 38, and the compressor 32, combustor 34, and high pressure turbine 37 form a gas generator 39 of the gas turbine engine 30. The compressor 32 compresses and delivers air to the combustor 34. The combustor 34 mixes fuel with the compressed air received from the compressor 32 and ignites the fuel. The hot, high pressure products of the combustion reaction in the combustor 34 are directed into the turbine 36 to cause the turbine 36 to rotate about a central axis of the gas turbine engine 30, drive the compressor 32, and rotate the drive shaft 31 to ultimately drive the rotor 22 and provide thrust to the aircraft 10.

The output shaft 21 extends from the side of the limited-slip coupler 40 opposite from the gas turbine engine 30. In the illustrative embodiment, the clutch 28 and the gear box 26 are disposed along the output shaft 21. In the illustrative embodiment, the clutch 28 is operable to connect or disconnect the rotor 22 from the gas turbine engine 30. The gear box 26 is operable to adjust an input speed, torque, and/or rotational direction provided by the gas turbine engine 30 into a desired output transmitted to the rotor 22. The gear box 26 and/or the clutch 28 may be in electrical communication with the controller 14. The controller 14 may disengage and engage the clutch 28 and/or adjust an output of the gearbox 26 transmitted to the rotor 22 based on user inputs and/or operating needs and conditions of the aircraft 10.

In the illustrative embodiment, the output shaft 21 includes one or more sensors 42 and an output shaft controller 44. In the illustrative embodiment, at least one of the sensors 42 includes a torquemeter 42 configured to measure a torque experienced by the output shaft 21. In the illustrative embodiment, the torquemeter 42 includes one or more strain gauges 42 positioned along the output shaft 21. The strain gauges 42 are in electrical communication with the output shaft controller 44. The output shaft controller 44 measures inputs from the strain gauges 42 to determine the torque experienced by the output shaft 21 and communicate the torque provided by the gas turbine engine 30 to the output shaft 21 to other systems of the aircraft 10. In some embodiments, the output shaft controller 44 may be included in the controller 14 of the aircraft 10.

Figure 4:
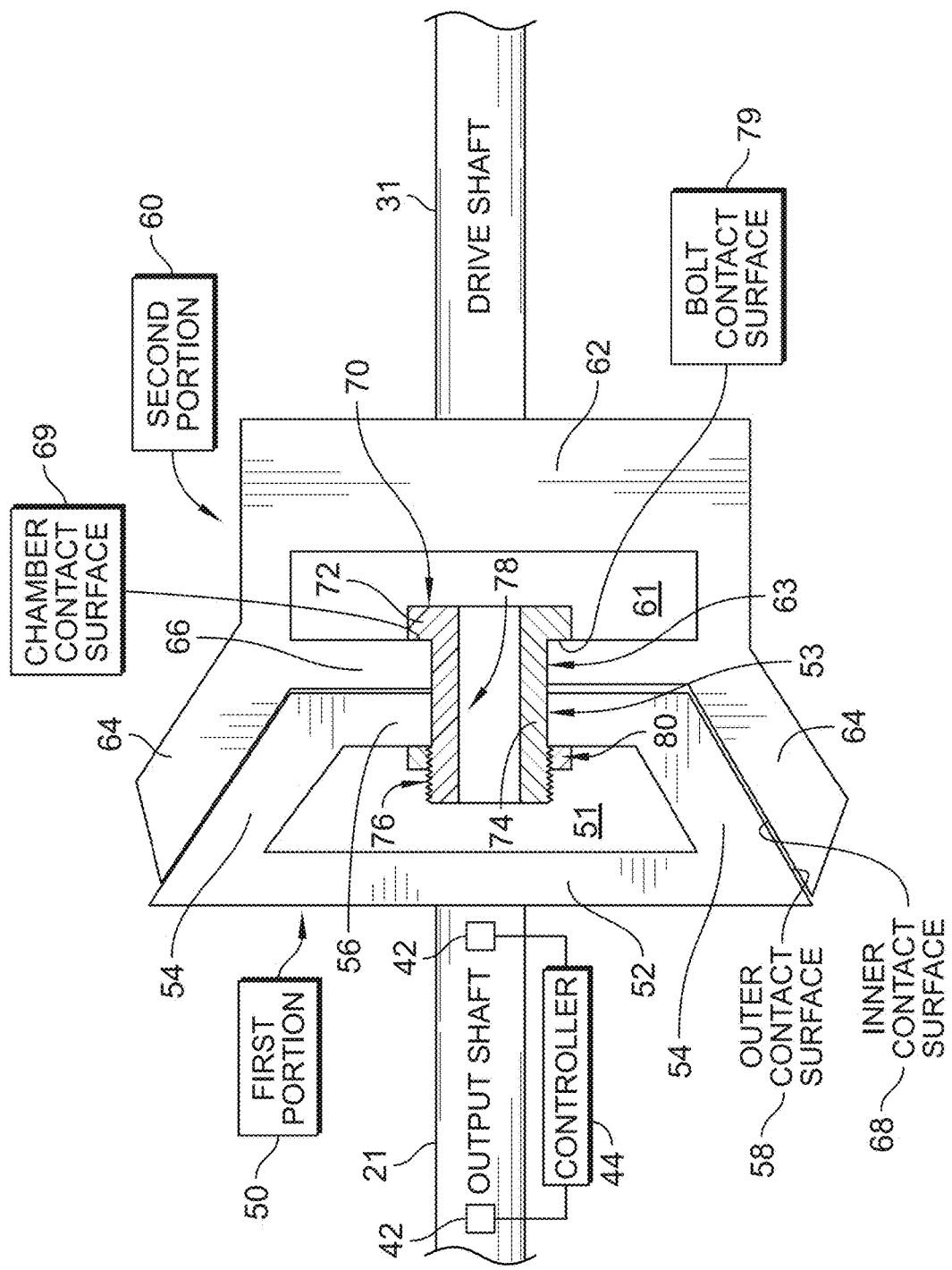
FIG. 4 is a cross section view of the of the limited-slip coupler of FIG. 3, showing the limited-slip coupler includes two portions with surfaces that sit flush against each other and a bolt extending through each of the two portions coupling them together, the geometry of the two portions of the limited-slip coupler and a pre-load force exerted on the two portions by the bolt setting a predetermined limit of the limited-slip coupler, which is operable to disengage the drive shaft from the output shaft when a torque transmitted by the gas turbine engine exceeds the predetermined limit.

The limited-slip coupler 40 is shown in more detail in FIG. 4. The limited-slip coupler 40 includes a first portion 50, a second portion 60, and a bolt 70 coupling the first portion 50 and the second portion 60 together. The first portion 50 is coupled to the output shaft 21 of the drive system 24. The second portion 60 is coupled to the drive shaft 31 of the gas turbine engine 30. The first portion 50 and second portion 60 are each formed to have interlocking and/or mating geometry such that one or more surfaces of the first portion 50 contact and/or mate with a corresponding surface of the second portion 60. In the illustrative embodiment, the first portion 50 is shaped to form a male coupling and the second portion 60 is shaped to form a female coupling such that the first portion 50 is inserted into and/or fits within at least a portion of the second portion 60.

In the illustrative embodiment, the first portion 50 of the limited-slip coupler 40 is shaped to form a conical frustum and/or truncated cone and includes a shaft coupling wall 52, a bolt receiving wall 56 spaced apart from the shaft coupling wall 52, and a sidewall 54 extending between the shaft coupling wall 52 and the bolt receiving wall 56, and which extends around the perimeter of the cone. The first portion 50 is hollow such that an inner chamber 51 is formed between the shaft coupling wall 52, the bolt receiving wall 56, and the sidewall 54. The shaft coupling wall 52 is coupled to the output shaft 21 such that when the first portion 50 rotates, the first portion 50 and the output shaft 21 rotate together. In the illustrative embodiment, the shaft coupling wall 52 has a larger diameter than the bolt receiving wall 56 such that the sidewall 54 extends radially inward as it extends from shaft coupling wall 52 to the bolt receiving wall 56.

In the illustrative embodiment, the second portion 60 of the limited-slip coupler 40 includes a respective shaft coupling wall 62, a bolt receiving wall 66 spaced apart from the shaft coupling wall 62, and a sidewall 64 extending outwards from the bolt receiving wall 66. The sidewall 64 extends outwards from the bolt receiving wall 66, away from and in an opposite direction from the shaft coupling wall 62. The second portion 60 is hollow such that an inner chamber 61 is formed between the shaft coupling wall 62 and the bolt receiving wall 56. The sidewall 64 is conical in shape and extends around a perimeter of the second portion 60. In the illustrative embodiment, the sidewall 64 extend radially outward as the sidewall 64 extends away from the bolt receiving wall 56. The shaft coupling wall 62 is coupled to the drive shaft 31 such that the drive shaft 31 rotates the second portion 60.

Each of the respective bolt receiving walls 56, 66 are shaped to form a respective aperture 53, 63 through which the bolt 70 extends, coupling the first portion 50 and the second portion 60 together. The bolt 70 includes a head 72 and a body 74. The body 74 of the bolt is shaped to form a threaded outer surface 76 at an end of the bolt 70 opposite the head 72 such that a nut 80 or other suitable fastener can be coupled and/or fastened to the end of the bolt 70 opposite the head 72.

In the illustrative embodiment, the bolt 70 is hollow and shaped to form an aperture 78 extending through the head 72 and body 74 of the bolt 70. In the illustrative embodiment, the bolt 70 is first inserted through the aperture 63 in the bolt receiving wall 66 of the second portion 60 and then through the aperture 53 in the bolt receiving wall 56 of the first portion 50 such that, when installed, the head 72 of the bolt 70 sits in the inner chamber 61 of the second portion. A bolt contact surface 79 on the underside of the head 72, closest to the body 74 and extending perpendicular to the body 74 in the illustrative embodiment, contacts and sits against a chamber contact surface 69 of the bolt receiving wall 66 of the second portion 60. The nut 80 is screwed onto the threaded portion 76 of the bolt 70 extending into the chamber 51 of the first portion 50, with the nut 80 disposed inside the chamber 51 and sitting against an inner surface of the bolt receiving wall 56 of the first portion 50.

When assembled, the nut 80 is assembled onto the threaded portion 76 of the body 74 of the bolt 70 and tightened. When assembled, the respective bolt receiving walls 56, 66 are disposed adjacent to each other. In some embodiments, the bolt receiving walls 56, 66 of the first portion 50 and the second portion 60 are in contact with each other. In some embodiments, the bolt receiving walls 56, 66 of the first portion 50 and the second portion 60 are spaced apart from each other with the bolt 70 spanning the gap between them. The nut 80 is tightened such that the bolt 70 is preloaded to change, adjust, and/or set an amount of preload force applied by the bolt 70 on the portions 50, 60 of the limited-slip coupler to at least partially adjust and/or set the predetermined limit. In some embodiments, the preload of the bolt 70 is determined to ensure that the coupler 40 has a predetermined limit that is within an ultimate load requirement of the output shaft 21.

Figures 5A, 5B:
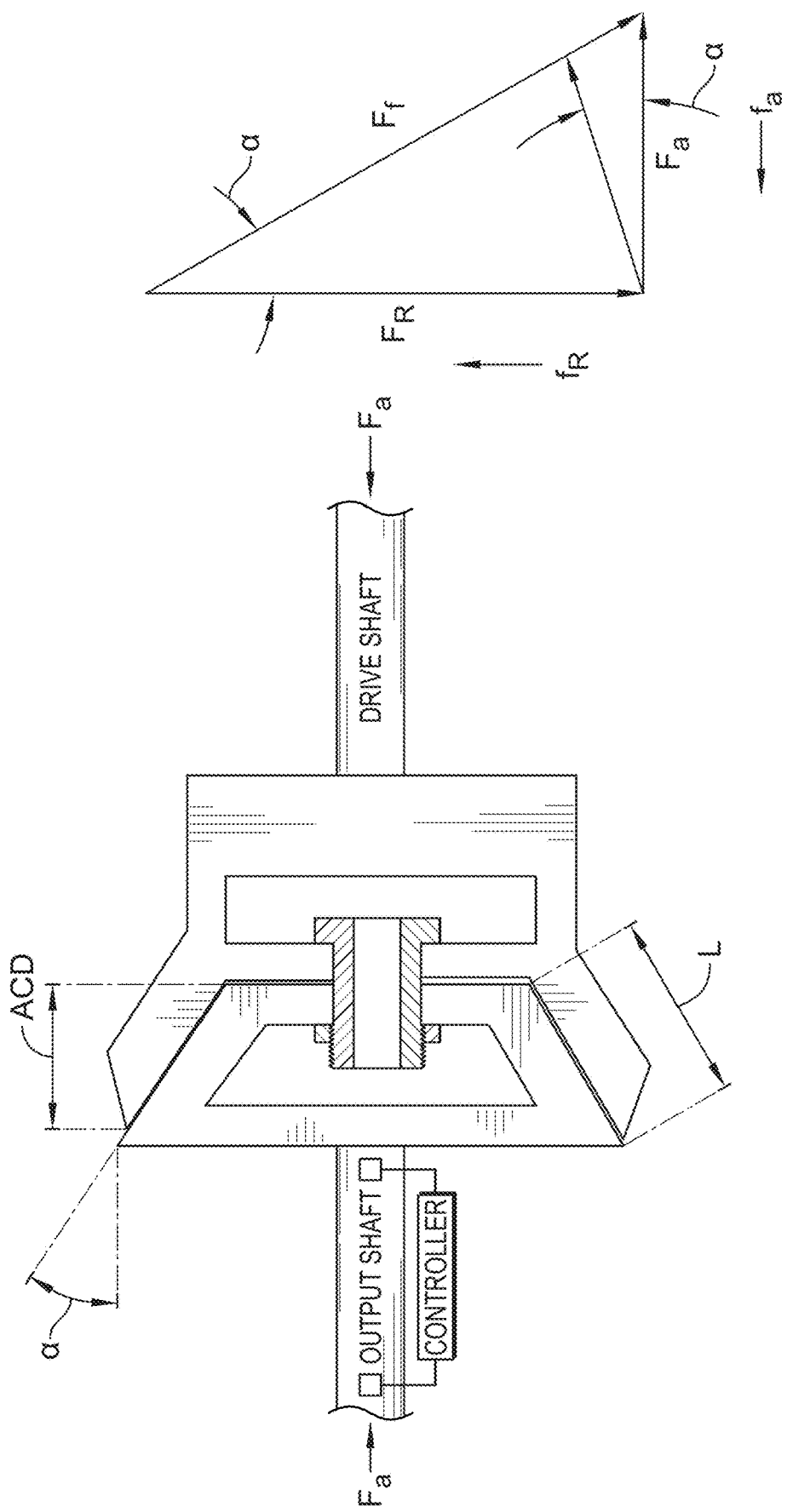
FIG. 5A is a force diagram of the limited-slip coupler of FIG. 4, showing certain dimensions of the design and applied forces used to determine an appropriate angle of the limited-slip coupler, affecting the predetermined limit.
FIG. 5B is geometric diagram view of the angles and forces shown in FIG. 5A.

When assembled, the sidewall 64 of the second portion 60 extends outside of and around the sidewall 54 of the first portion 50, receiving the first portion 50 within the sidewall 64 of the second portion 60 of the limited-slip coupler 40. When in contact, an outer contact surface 58 of the sidewall 54 of the first portion 50 contacts an inner contact surface 68 of the sidewall 64 of the second portion 60. The outer contact surface 58 of the sidewall 54 of the first portion 50 and the inner contact surface 68 of the sidewall 64 of the second portion 60 form an angle α with respect to the output shaft 21 and/or the drive shaft 31, as shown in FIG. 5A. In the illustrative embodiment, the output shaft 21 and the drive shaft 31 are colinear. As shown in FIG. 5A, the contact surfaces 58, 68 overlap or contact each other along a distance L, where L is oriented in the direction of the plane of contact of the surfaces 58, 68. The contact distance L has a length along the axial direction of the shafts 21, 31, or an axial contact distance ACD. In the illustrative embodiment, the angle α of the sidewalls 54, 64, the length L of the contact distance, and/or the axial length ACD of the contact distance are designed, adjusted, and/or set to at least partially adjust or set the predetermined limit.

FIGS. 5A-5B further illustrates the forces and/or dimensions that may be used when selecting an appropriate angle α, along with the below equations. In FIGS. 5A-5B and the below equations, $F_a$ is axial force applied along the drive shaft 31 and the output shaft 21, $F_R$ is the radial force, $F_f$ is the friction force, and μ is the coefficient of friction. Using the equation $\mu \times F_R \leq F_a$, where $F_a = F_f \times \sin \alpha$ and $F_R = F_f \times \cos \alpha$, the equation then becomes $\mu \times F_f \times \cos \alpha \leq F_f \times \sin \alpha$. The equation can be simplified further to $$\mu \leq \frac{F_f \times \sin \alpha}{F_f \times \cos \alpha},$$

and then to $\mu \leq \tan \alpha$.

Additionally or alternatively, the materials of the first portion 50 and the second portion 60 may be selected based on a desired coefficient of friction of the inner contact surface 68 and the outer contact surface 58, which also may at least partially determine the predetermined limit. Additionally or alternatively, one or more of the contact surfaces 58, 68, 69, 79 may be machined to have a certain surface finish, affecting the coefficient of friction of the contact surface. In some embodiments, the first and second portions 50, 60 are steel such that the contact surface interfaces are steel on steel when engaged.

During operation, once the limited-slip coupler 40 has slipped, causing at least one or more of the contact surfaces 58, 68, 69, 79 to slip with respect to each other, the surface of at least one of the contact surfaces may change due to rubbing against another contact surface. This may change the coefficient of friction and/or change the predetermined limit of the coupler 40. In some embodiments, as slipping between components of the coupler 40 affects the properties and/or predetermined limit of the coupler 40, the coupler 40 may only disengage and reengage once or twice during operation as design. The coupler 40 may then be required to be replaced.

During operation of the propulsion unit 20, the limited-slip coupler 40 operates to decouple the output shaft 21 from the drive shaft 31 in response to a transmitted torque passing between the drive shaft 31 and the output shaft 21 exceeding the predetermined limit of the coupler 40. The limited-slip coupler 40 operates to recouple the output shaft 21 to the drive shaft 31 upon return of the transmitted torque to less than the predetermined limit. In the illustrative embodiment, the limited-slip coupler 40 is designed such that when the predetermined limit is exceeded, the head 72 of the bolt 70 rotates and/or slips with respect to the bolt receiving wall 66 of the second portion 60 at the chamber contact surface 69 and the bolt contact surface 79, and the bolt 70 stays fixed with respect to the first portion 50.

Additionally or alternatively, the limited-slip coupler 40 is designed such that when the predetermined limit is exceeded, the sidewall 64 of the second portion 60 rotates and/or slips with respect to the sidewall 54 of the first portion 50 at the outer contact surface 58 and the inner contact surface 68. The limited-slip coupler 40 operates without reliance on electronic controls so as to quickly, automatically avoid over-torque conditions that can damage the drive system 24. In the illustrative embodiment, the limited-slip coupler 40 operates to avoid components disposed along the output shaft 21, such as the sensors 42, from experiencing an over-torque condition such as a torque spike.

For example, when the one of the propulsion units 20 fails or has a reduced thrust output that is lower than expected, the controller 14 may divert or redistribute power that was being supplied to the failed propulsion unit 20 to the other of the two propulsion units 20. The controller 14 may redistribute the power to the other, normally operating propulsion unit 20 to maintain a total or overall expected level of thrust between the two propulsion units. The redistribution of power from the controller 14 may lead to a spike in torque supplied by the gas turbine engine 30 of the normally operating propulsion unit 20 that receives the distributed power.

The torque spike, which exceeds the predetermined limit of the coupler 40, could otherwise result in damage to components of the propulsion unit 20, such as the sensors 42 on the output shaft 21. The limited-slip coupler 40 prevents such damage from happening by having the predetermined limit set below a maximum torque rating of the propulsion unit 20 components. For example, the maximum torque rating of the drive system 24 and/or its components are used to determine a load limit of the drive system 24, which may be a percentage of the maximum torque rating including a particular margin error and/or a factor of safety. In some embodiment, the predetermined load is based of the load limit. When such a torque spike happens, the portions 50, 60 of the limited-slip coupler 40 slip respective to each other, preventing the torque spike from being transmitted to the output shaft 21. In some embodiments, the slip may only last a fraction of a second, but still be able to prevent damage.

For the purposes of the present disclosure, the modifiers about and approximately mean±1% of the given value. Of course, greater or lesser deviation is contemplated and may be used in processed method within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An aircraft comprising
a first propulsion unit including a first drive system configured to output rotational motion and a first driven rotor coupled to the first drive system and configured to accelerate air providing thrust to move the aircraft,
a second propulsion unit including a second drive system configured to output rotational motion and a second driven rotor coupled to the second drive system and configured to accelerate air providing thrust to move the aircraft, and
a controller coupled to both the first propulsion unit and the second propulsion unit, the controller configured to increase thrust output in one of the first propulsion unit or the second propulsion unit in response to a detected thrust reduction from the other of the first propulsion unit or the second propulsion unit to maintain a desired overall level of thrust delivery from a combination of the first propulsion unit and the second propulsion unit,
wherein each of the first propulsion unit and the second propulsion unit include a gas turbine engine with a drive shaft, an output shaft coupled between the drive shaft and the respective driven rotor, and a mechanical means for decoupling the output shaft from the drive shaft in response to a transmitted torque passing between the drive shaft and the output shaft exceeding a predetermined limit and for recoupling the output shaft to the drive shaft upon return of the transmitted torque to less than the predetermined limit without reliance on electronic controls so as to quickly avoid over-torque conditions that can damage propulsion unit systems,
wherein the mechanical means includes a first portion coupled to the output shaft, a second portion coupled to the drive shaft, and a bolt configured to couple the first portion to the second portion, wherein the bolt is configured to adjust the predetermined limit.

2. The aircraft of claim 1 further comprising a torquemeter disposed along the output shaft.

3. The aircraft of claim 2, wherein the mechanical means is configured to protect the torquemeter from the over-torque conditions when the transmitted torque exceeds the predetermined limit.

4. The aircraft of claim 2, wherein the torquemeter is in electrical communication with the controller to communicate a torque provided by the gas turbine engine.

5. The aircraft of claim 1, wherein the first portion and the second portion are shaped to have corresponding mating geometry, the first portion shaped to fit at least partially within the second portion.

6. The aircraft of claim 1, wherein the second portion includes an inner contact surface and the first portion includes an outer contact surface, the inner contact surface of the second portion configured to engage with the outer contact surface of the first portion such that rotation of the second portion drives rotation of the first portion when the transmitted torque is less than the predetermined limit.

7. The aircraft of claim 6, wherein the mechanical means comprises a nut disposed on the bolt, wherein the bolt extends through an aperture formed in each of the first portion and the second portion, a head of the bolt in contact with a bolt receiving wall of the second portion and the nut in contact with a bolt receiving wall of the first portion to couple the first portion and the second portion together.

8. The aircraft of claim 7, wherein the bolt receiving wall of the first portion is opposite from the outer contact surface and the bolt receiving wall of the second portion is opposite from the inner contact surface such that adjustment of the nut on the bolt adjusts a preload of the bolt and changes the predetermined limit.

9. The aircraft of claim 7, wherein an angle of the inner contact surface and the outer contact surface with respect to the drive shaft at least partially determines the predetermined limit.

10. The aircraft of claim 7, wherein the limited-slip coupler is configured such that the head of the bolt and the second portion are configured to rotate relative to each other when the transmitted torque exceeds the predetermined limit.

11. The aircraft of claim 7, wherein the limited-slip coupler is configured such that the inner contact surface the second portion and the outer contact surface of the first portion rotate relative to each other when the transmitted torque exceeds the predetermined limit.

12. The aircraft of claim 1, wherein each of the first propulsion unit and the second propulsion unit further include a torquemeter, an output shaft controller, and clutch coupled along the output shaft between the driven rotor and the mechanical means for decoupling the output shaft from the drive shaft to manage torque transmitted to the driven rotor.

13. An aircraft comprising
  a first propulsion unit including a first drive system configured to output rotational motion and a first driven rotor coupled to the first drive system and configured to accelerate air providing thrust to move the aircraft,
  a second propulsion unit including a second drive system configured to output rotational motion and a second driven rotor coupled to the second drive system and configured to accelerate air providing thrust to move the aircraft, and
  a controller coupled to both the first propulsion unit and the second propulsion unit, the controller configured to increase thrust output in one of the first propulsion unit or the second propulsion unit in response to a detected thrust reduction from the other of the first propulsion unit or the second propulsion unit to maintain a desired overall level of thrust delivery from a combination of the first propulsion unit and the second propulsion unit,
  wherein each of the first propulsion unit and the second propulsion unit include a gas turbine engine with a drive shaft, an output shaft coupled between the drive shaft and the respective driven rotor, and a limited-slip coupler having a first portion coupled to the output shaft and a second portion coupled to the drive shaft, the limited-slip coupler to decouple the output shaft from the drive shaft in response to a transmitted torque passing between the drive shaft and the output shaft exceeding a predetermined limit and for recoupling the output shaft to the drive shaft upon return of the transmitted torque to less than the predetermined limit,
  wherein the limited-slip coupler includes a central bolt aligned with the drive shaft and the output shaft, the bolt configured to adjust the predetermined limit.

14. The aircraft of claim 13 further comprising a torquemeter disposed along the output shaft, wherein the limited-slip coupler is configured to protect the torquemeter from over-torque conditions when the transmitted torque exceeds the predetermined limit, the predetermined limit being less that a maximum torque limit of the torquemeter.

15. The aircraft of claim 13, wherein the second portion includes an inner contact surface and the first portion includes an outer contact surface, the inner contact surface of the second portion configured to engage with the outer contact surface of the first portion such that rotation of the second portion drives rotation of the first portion when the transmitted torque is less than the predetermined limit.

16. The aircraft of claim 15, wherein the bolt extends through an aperture formed in each of the first portion and the second portion to couple the first portion and the second portion together, the bolt being preloaded to at least partially determine the predetermined limit, wherein the predetermine limit is within a maximum torque limit of the output shaft.

17. The aircraft of claim 16, wherein at least one of an angle of the inner contact surface and the outer contact surface with respect to the drive shaft or a surface finish of the inner contact surface and the outer contact surface at least partially determines the predetermined limit.

18. The aircraft of claim 13, wherein each of the first propulsion unit and the second propulsion unit further include a torquemeter, an output shaft controller, and clutch coupled along the output shaft between the driven rotor and the limited-slip coupler for decoupling the output shaft from the drive shaft to manage torque transmitted to the driven rotor.

19. An aircraft comprising
  a first propulsion unit,
  a second propulsion unit, and
  a controller coupled to both the first propulsion unit and the second propulsion unit, the controller configured to increase thrust output in one of the first propulsion unit or the second propulsion unit in response to a detected thrust reduction from the other of the first propulsion unit or the second propulsion unit to maintain a desired overall level of thrust delivery from a combination of the first propulsion unit and the second propulsion unit,
  wherein each of the first propulsion unit and the second propulsion unit include a gas turbine engine with a drive shaft, an output shaft coupled between the drive shaft and a respective driven rotor, and a limited-slip coupler having a first portion coupled to the output shaft and a second portion coupled to the drive shaft, the limited-slip coupler to decouple the output shaft from the drive shaft in response to a transmitted torque passing between the drive shaft and the output shaft exceeding a predetermined limit and for recoupling the output shaft to the drive shaft upon return of the transmitted torque to less than the predetermined limit,
  wherein the limited-slip coupler includes a central bolt aligned with the drive shaft and the output shaft, the bolt configured to adjust the predetermined limit to set the predetermined limit within a maximum torque limit of the output shaft.

* * * * *